United States Patent [19]

Broer et al.

[11] Patent Number: 4,718,748
[45] Date of Patent: Jan. 12, 1988

[54] OPTICAL GLASS FIBRE HAVING A SYNTHETIC RESIN CLADDING AND METHOD OF MANUFACTURING SAME

[75] Inventors: Dirk J. Broer; Grietje N. Mol, both of Eindhoven, Netherlands

[73] Assignee: U.S. Philips Corporation, New York, N.Y.

[21] Appl. No.: 708,186

[22] Filed: Mar. 4, 1985

[30] Foreign Application Priority Data

Mar. 7, 1984 [NL] Netherlands .................. 8400727

[51] Int. Cl.$^4$ ................... B32B 9/00; C02B 6/00; C02B 6/10
[52] U.S. Cl. ................. 350/96.30; 350/96.34; 428/391; 428/392; 428/375
[58] Field of Search ............... 428/375, 391, 392, 373, 428/447; 65/3.41; 350/96.29, 96.30, 96.31, 96.34, 96.33; 528/26

[56] References Cited

U.S. PATENT DOCUMENTS

| 3,865,588 | 2/1975 | Ohto et al. | 204/159.13 |
| 4,270,840 | 6/1981 | Uchida et al. | 350/96.34 |
| 4,344,669 | 8/1982 | Uchida et al. | 350/96.34 |
| 4,348,454 | 9/1982 | Eckberg | 428/447 X |
| 4,472,021 | 9/1984 | Ansel et al. | 350/96.23 |
| 4,496,210 | 1/1985 | Ansel et al. | 65/3.41 X |

FOREIGN PATENT DOCUMENTS

| 653550 | 12/1962 | Canada | 428/429 |
| 293013 | 3/1971 | U.S.S.R. | 65/3.41 |

*Primary Examiner*—Lorraine T. Kendell
*Attorney, Agent, or Firm*—Norman N. Spain

[57] ABSTRACT

The invention provides an optical glass fibre having a synthetic resin cladding and a method of manufacturing same, in which the first layer of the synthetic resin cladding is formed from a curable polysiloxane composition.

The curing rate is increased by the presence of acrylate groups. The refractive index (exceeding 1.46) and the glass transition temperature (lower than $-50°$ C.) can be adjusted by the ratio of the dimethyl siloxane groups, methyl phenyl siloxane groups and diphenyl siloxane groups present. The curing rate can furthermore be increased by the addition of monomeric acrylate compounds.

11 Claims, 3 Drawing Figures

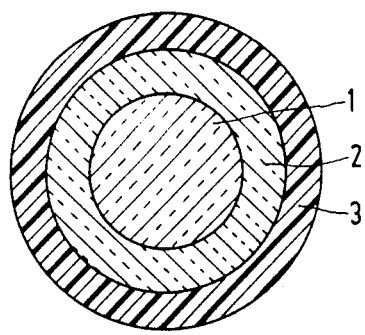
FIG.1
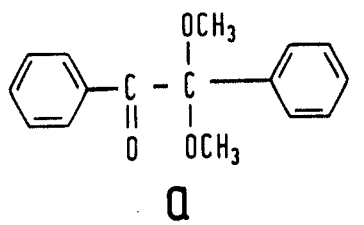
a
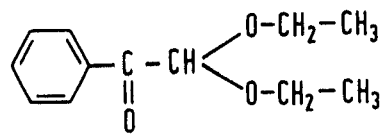
b
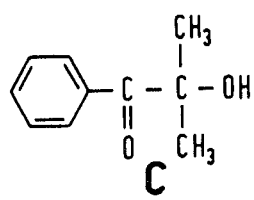
c   FIG.2
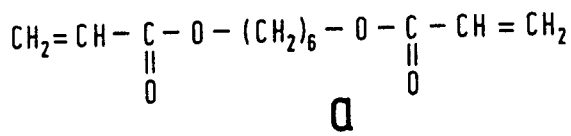
a
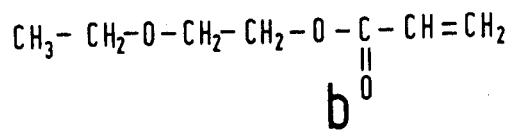
b
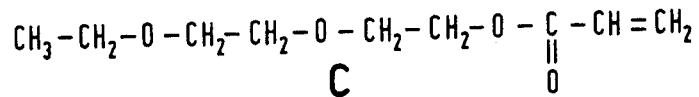
c
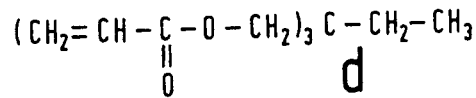
d   FIG.3

OPTICAL GLASS FIBRE HAVING A SYNTHETIC RESIN CLADDING AND METHOD OF MANUFACTURING SAME

The invention relates to an optical glass fibre having a synthetic resin cladding, comprising a glass fibre and an enveloping layer of a synthetic rubber having a refractive index which is higher than the refractive index of the outermost layer of the glass fibre, the synthetic rubber being formed from a curable synthetic resin composition which comprises a copolymer which has monomeric units comprising dimethyl siloxane and at least one siloxane selected from the group formed by methyl phenyl siloxane and diphenyl siloxane.

The invention also relates to a method of manufacturing an optical glass fibre having a synthetic resin cladding, in which a glass fibre immediately after production is cladded with a layer of a curable synthetic resin composition which comprises a copolymer which comprises as monomeric units dimethyl siloxane and at least one siloxane selected from the group formed by methyl phenyl siloxane and diphenyl siloxane, after which the curable synthetic resin composition is made to cure.

Such an optical glass fibre and method of manufacturing same are known from U.S. Pat. No. 4,270,840. In this specification a glass fibre, immediately after production, is provided with a cladding to prevent the fibre from losing its originally large strength by damage of the surface or by corrosion. For that purpose, a first soft layer is provided around the fibre. Said first layer, having rubber-like properties, moreover ensures that small axial bends of the fibre are counteracted so that the glass fibre shows only small optical losses. The layer is formed from a curable synthetic resin composition which is made to cure by raising the temperature, in which a reaction occurs between vinyl groups in the synthetic resin composition under the influence of a platinum compound as a catalyst. It is also possible to use a synthetic resin composition which is cured under the influence of light in the presence of a benzoin compound as an initiator. The cured layer has a refractive index between 1.40 and 1.52 and a Young's modulus which is smaller than 2 MPa. The cladding rate of the glass fibre is 0.5 to 2 m/s.

A second layer is then provided which may have the same composition as the first layer but may have a higher Young's modulus and a smaller refractive index. Moreover, a cladding of a thermoplastic synthetic resin may be provided around the fibre, for example by extrusion.

An optical glass fibre as described hereinbefore may be used for the transmission of light signals over large distances, for example for telecommunication purposes.

It is an object of the invention to provide an optical glass fibre having a synthetic resin cladding and a method of manufacturing same, in which a curable synthetic resin composition is used having a curing time which is shorter than 5 sec., preferably shorter than 0.5 sec. As a result of this a cladding rate of the glass fibre is possible which exceeds 5 m/s without the required device having uneconomically large dimensions.

A further object of the invention is to provide such an optical glass fibre in which the cured synthetic resin composition has a Young's modulus between 0.1 and 10 MPa and in which the cured synthetic resin composition does not flow at temperatures up to 250° C. It is desired for the cured synthetic resin composition to show good properties without using solid filllers because these may scratch the fibres so that the strength of the fibre might be deteriorated.

An additional object of the invention is to provide an optical glass fibre having a synthetic resin cladding and a method of manufacturing same in which the curable synthetic resin composition can be provided on a fast moving fibre in a homogeneous layer without the formation of drops, even when the fibre is at a high temperature.

A further object of the invention is to provide such an optical glass fibre in which the synthetic resin cladding at the end of the glass fibre can simply be removed entirely by stripping so as to be able to make connections. Stripping may be done both mechanically and by the use of a solvent.

Finally, in the case in which the curable synthetic resin layer is used on a fibre of quartz glass and in which curing is carried out by means of UV light it is desirable for the curable synthetic resin composition to absorb the UV light sufficiently to prevent damage to the quartz glass.

According to the invention, these objects are achieved by an optical glass fibre having a synthetic resin cladding and a method of manufacturing same in which a curable synthetic resin composition is used which comprises a copolymer which is a compound of the following formula:

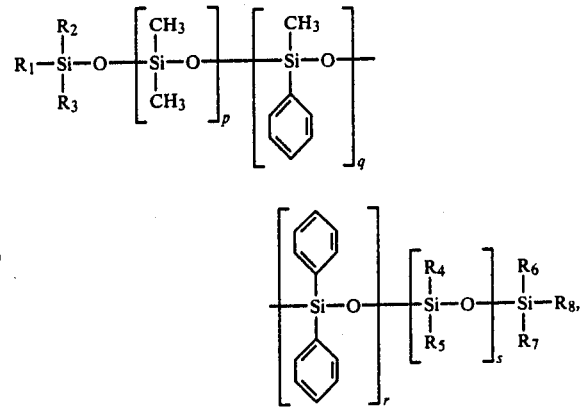

wherein $R_1$ and $R_8$ are organic groups which are selected from the group formed by alkyl groups, aryl groups and acrylate-containing alkyl groups, wherein $R_2$, $R_3$, $R_4$, $R_6$ and $R_7$ are organic groups which are selected from the group formed by alkyl groups and aryl groups, and wherein $R_5$ is an acrylate-containing organic group, the average molecular weight of the polymer molecules being between 1,000 and 1,000,000, the average fractions of the monomeric units per polymer molecule being within the following limits:

| | |
|---|---|
| $0.005 \leq p \leq$ | $0.995$ |
| $0 \leq q \leq$ | $0.995$ |
| $0 \leq r \leq$ | $0.49$ |
| $0 \leq s \leq$ | $0.1,$ | wherein $0.005 \leq (q+2r) \leq 0.995$ and wherein the monomeric units may be distributed in the molecule blockwise, alternatingly or randomly and in which the copolymer comprises at least two acrylate groups per molecule.

The alkyl groups are preferably selected from short-chain alkyl groups, such as methyl and ethyl groups. Examples of suitable aryl groups are phenyl and benzyl groups.

An acrylate-containing alkyl group is a group of the following formula:

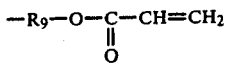

wherein $R_9$ is a bivalent alkyl radical, for example $-(CH_2)_n-$, wherein $n \geq 1$.

In a blockwise distribution of monomeric units in a copolymer molecule the identical monomeric units are present in one or more groups which are connected with one or more groups which are built up from other monomeric units. In an alternating distribution of monomeric units in a copolymer molecule there is a substantially regular structure in which one type of monomeric unit in the polymer chain is always alternated by another type of monomeric unit. In a random distribution of monomeric units in a copolymer molecule the various types of monomeric units are distributed arbitrarily in the polymer chain in groups of varying length and composition.

In a suitable curable synthetic resin composition according to the invention, $R_5$ is an acrylate-containing alkyl group.

The curing rate is high if a value of s which is not too small is chosen. The reactive groups $R_5$ in the centre of the polymeric chain have a smaller mobility and hence a lower reaction rate, than the terminal groups $R_1$ and $R_8$, but with a sufficiently large number there is still a noticeable shortening of the curing time. A curing time shorter than 0.5 sec. is achieved in a curable synthetic resin composition according to the invention, in which s exceeds 0.02.

In an other suitable curable synthetic resin composition according to the invention, r and s are equal to zero and $R_1$ and $R_8$ are acrylate-containing alkyl groups.

A high curing rate can also be achieved if more than two reactive terminal groups are present in the molecule because the polymer molecule is branched. This can be achieved according to the invention if $R_5$ is an acrylate-containing polysiloxane chain of the same type and of the same average composition as the main chain of the polymer molecule.

In order to obtain an optical glass fibre according to the invention in which the cured synthetic resin composition shows a glass transition temperature which is lower than $-50°$ C. and a refractive index which is larger than 1.46 it is efficacious for (q+2r) to be between the limits 0.25 and 0.6. With a refractive index exceeding 1.46 it is achieved that when quartz glass fibres are used the light is only conducted through the core of the glass fibre.

In order to simplify a visual inspection during manufacturing such an optical glass fibre the refractive index preferably exceeds 1.48. This can be achieved, together with a sufficient UV-absorbing capacity to protect quartz glass fibres, if (q+2r) is between the limits 0.4 and 0.6.

The curable synthetic resin composition can be cured by exposure to UV light or by exposure to electrons. If curing is done by exposure to UV light a photosensitive initiator must be added to the synthetic resin composition.

In an optical glass fibre according to the invention with a synthetic resin composition cured by using UV light it is efficacious for the curable synthetic resin composition to comprise 1 to 5% by weight of a photosensitive initiator.

In a particular embodiment the photosensitive initiator is selected from the group formed by 2.2-dimethoxy-2-phenyl-acetophenone, 2,2-diethoxy-acetophenone and 2,2-dimethyl-2-hydroxy-acetophenone.

An optical glass fibre according to the invention having a particularly rapidly curable synthetic resin composition is obtained if the curable synthetic resin composition comprises 0 to 20% by weight of one or more monomeric acrylate compounds.

In a particular embodiment the monomeric acrylate compounds are selected from the group formed by hexanediol diacrylate, 2-ethoxy-ethyl acrylate, 2'-ethoxy-2-ethoxy-ethyl acrylate and trimethylol propane triacrylate.

A preferred curable synthetic resin composition and a method for manufacturing such a composition have been described in Applicant's U.S. patent application Ser. No. 899,770, filed Aug. 22, 1986

In a suitable embodiment of a method according to the invention the curable synthetic resin composition is made to cure by exposure to electrons.

Another suitable embodiment of a method in accordance with the invention is characterized in that the curable synthetic resin composition comprises a photosensitive initiator and is made to cure by exposure to UV light.

The invention will now be described in greater detail with reference to examples and to a drawing in which FIG. 1 is a cross-sectional view of a possible embodiment of a glass fibre with synthetic resin cladding according to the invention, FIG. 2a shows 2,2,-dimethoxy-2-phenyl-acetophenone, FIG. 2b shows 2,2-diethoxy-acetophenone, FIG. 2c shows 2,2-dimethyl-2-hydroxy-acetophenone, FIG. 3a shows hexanediol diacrylate, FIG. 3b shows 2-ethoxy-ethyl acrylate, FIG. 3c shows 2'ethoxy-2-ethoxy-ethyl acrylate and in which FIG. 3d shows trimethylol propane triacrylate.

EMBODIMENT OF THE METHOD ACCORDING TO THE INVENTION

A glass fibre is formed in known manner by drawing from a perform. FIG. 1 is a sectional view of a glass fibre comprising a core glass 1 and a cladding glass 2 of different refractive indices. The method according to the invention may also be used for glass fibres which are formed with the double crucible method and instead of a stepped refractive index variation there may also be a gradually varying refractive index. The glass fibre shown in FIG. 1 has a circular cross-section but the cross-section may also have any other shape, for example, elliptical or square.

Immediately after drawing of the fibre a layer of a curable synthetic resin composition which comprises a copolymer and 4% by weight of a photosensitive initiator is provided on the glass fibre. A suitable layer thickness on a glass fibre having a diameter of 125 μm is, for example 30 μm. The copolymer is a compound described above in which the number-averaged molecular weight $M_n = 30,000$ and in which p=0.52, q=0.42, $s=0.06$, and wherein $R_5$ is an acrylate-containing alkyl group. 2,2-dimethoxy-2-phenyl-acetophenone (FIG. 2a) is used as a photosensitive initiator. The curable synthetic resin composition has a refractive index $n_D=1.4887$. The viscosity at 25° C. is 1030 mPa.s, at 45° C. it is 460 mPa.s.

The curable synthetic resin composition is cured while forming a layer of a synthetic rubber 3. For curing is suitable, for example, a high-pressure mercury lamp which produces light of wavelengths between 200 and 400 nm and an intensity measured on the synthetic resin composition of 0.6 W/cm². The curing time is 0.12 seconds. The curable synthetic resin composition can also be cured by exposure to electrons with an energy of 100 to 500 keV. For that purpose is suitable, for example, an Electrocurtain device (product of Energy Sciences Inc., Woburn, Mass.).

The cured synthetic resin composition 3 has a refractive index $n_D=1.4890$, a glass transition temperature $T_g=-68°$ C. and a Young's modulus of 0.8 MPa.

For further protection the glass fibre may be enveloped with a second layer of synthetic resin preferably having a higher modulus of elasticity. For this purpose is suitable, for example, a layer having a thickness of 30 μm from a UV curable acrylate resin having a Young's modulus of 100 MPa.

Moreover, the glass fibre may be enveloped with a cladding of a thermoplastic synthetic resin, for example nylon, having a thickness of 325 μm. Also, a tube of a synthetic resin in which the fibre is situated loosely may be extruded around the fibre.

Examples of optical glass fibres according to the invention

Glass fibres are provided with a synthetic resin cladding, in a manner analogous to the method described hereinbefore, with curable synthetic resin compositions according to table 1. Table 1 lists some properties of curable synthetic resin compositions for different ratios of the monomeric units in the copolymer. $T_g$ is the glass transition temperature of the material after curing, i.e. the temperature above which the material shows rubber-like properties. $n_D^{25}$ is the refractive index of the material at 25° C. prior to curing.

TABLE 1

| P | q | s | $T_g$(°C.) | $n_D^{25}$ |
|---|---|---|---|---|
| 0.60 | 0.40 | 0 | −80 | 1.481 |
| 0.39 | 0.61 | 0 | −55 | 1.506 |
| 0.41 | 0.58 | 0.01 | −59 | 1.503 |
| 0.49 | 0.49 | 0.02 | −60 | 1.500 |
| 0.69 | 0.25 | 0.06 | −94 | 1.461 |
| 0.56 | 0.38 | 0.06 | −77 | 1.478 |

It appears from table 1 that the glass transition temperature decreases with an increasing content of dimethyl siloxane. On the other hand the refractive index increases when the content of methyl phenyl siloxane or diphenyl siloxane increases.

The curing rate is increased when a quantity of a co-reacting monomeric acrylate compound is added to the curable synthetic resin composition. The effect of the addition of hexanediol diacrylate (HDDA, FIG. 3a), 2'-ethoxy-2-ethoxy-ethyl acrylate (EEEA, FIG. 3c) or trimethylol propane triacrylate (TMPTA, FIG. 3d) is shown in table 2 in which some properties of the resulting cured materials are also listed. The copolymer used has a number-averaged molecular weight $M_n=14,000$, $p=q=0.49$ and $s=0.02$. The curing time is the time which is necessary to obtain a non-tuchy surface upon curing with UV light by means of a lamp as described above.

TABLE 2

| HDDA (wt. %) | EEEA (wt. %) | TMPTA (wt. %) | curing time (s) | $T_g$(°C.) | $n_D^{25}$ |
|---|---|---|---|---|---|
| 0 | 0 | 0 | 4.8 | −60 | 1.503 |
| 10 | 0 | 0 | 0.12 | −57 | 1.504 |
| 20 | 0 | 0 | 0.06 | −57 | 1.505 |
| 0 | 10 | 0 | 2.4 | −60 | 1.500 |
| 0 | 20 | 0 | 2.3 | −60 | 1.496 |
| 0 | 0 | 20 | 0.05 | −57 | 1.507 |

The increase of the reaction rate is surprisingly large, notably when hexanediol diacrylate or trimethylol propane triacrylate is used. With an addition of less than 20% by weight of a monomeric acrylate the glass transition temperature increases only slightly so that the rubber-like properties of the cured product are not detrimentally influenced. The small influence on the refractive index may be used to bring the refractive index within narrow limits at a desired value.

Flow promoters may furthermore be added to the curable synthetic resin composition, for example, hexamethyl disiloxane, acryloxypropyl pentamethyl disiloxane, and diacryloxypropyl tetramethyl disiloxane.

In a glass fibre according to the invention, crystallisation in the synthetic rubber above the glass transition temperature thereof does not occur, and does not occur at low temperatures near the glass transition temperature either, so that the Young's modulus has a low value there also.

What is claimed is:

1. An optical fibre having a synthetic resin cladding, comprising a glass fibre and an enveloping layer of a synthetic rubber having a refractive index which is higher than the refractive index of the outermost layer of the glass fibre, the synthetic rubber being formed from a curable synthetic resin composition which comprises a copolymer which has monomeric units comprising dimethyl siloxane and at least one siloxane selected from the group consisting of methyl phenyl siloxane and diphenyl siloxane, characterized in that the copolymer is a compound of the formula

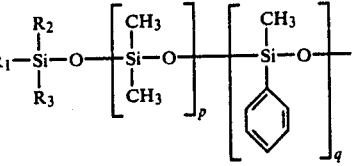

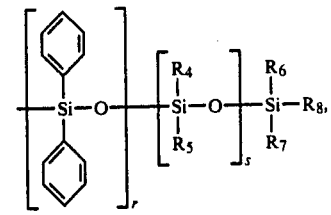

where $R_1$ and $R_8$ are organic groups which are selected from the group consisting of alkyl groups, aryl groups and acrylate-containing alkyl groups, wherein $R_2$, $R_3$, $R_4$, $R_6$ and $R_7$ are organic groups which are selected from the group consisting of alkyl groups and aryl groups, and wherein $R_5$ is an acrylate-containing organic group, the average molecular weight of the polymer molecules being between 1,000 and 1,000,000, the average fractions of the monomeric units per polymer molecule being within the following limits:

```
0.005 ≦ p ≦ 0.995
0     ≦ q ≦ 0.995
0     ≦ r ≦ 0.49
0     ≦ s ≦ 0.1
``` wherein $0.005 \leq (q+2r) \leq 0.995$ and wherein the monomeric units may be distributed in the molecule blockwise, alternatingly or randomly and in which the copolymer comprises at least two acrylate groups per molecule.

2. An optical glass fibre as claimed in claim 1, characterized in that $R_5$ is an acrylate-containing alkyl group.

3. An optical glass fibre as claimed in claim 1, characterized in that s exceeds 0.02.

4. An optical glass fibre as claimed in claim 1, characterized in that r and s are equal to zero and $R_1$ and $R_8$ are acrylate-containing alkyl groups.

5. An optical glass fibre as claimed in claim 1, characterized in that $R_5$ is an acrylate-containing polysiloxane chain of the same type and of the same average composition as the main chain of the polymer molecule.

6. An optical glass fibre as claimed in claim 1, characterized in that (q+2r) is between the limits 0.25 and 0.6.

7. An optical glass fibre as claimed in claim 6, characterized in that (q+2r) is between the limits 0.4 and 0.6.

8. An optical glass fibre as claimed in claim 1, characterized in that the curable synthetic resin composition comprises 1 to 5% by weight of the photosensitive initiator.

9. An optical glass fibre as claimed in claim 8, characterized in that the photosensitive initiator is selected from the group consisting of 2,2-dimethoxy-2-phenyl acetophenone, 2,2,diethoxy-acetophenone and 2,2-dimethyl-2-hydroxy-acetophenone.

10. An optical glass fibre as claimed in claim 1, characterized in that the curable synthetic resin composition comprises 0 to 20% by weight of one or more monomeric acrylate compounds.

11. An optical glass fibre as claimed in claim 10, characterized in that the monomeric acrylate compounds are selected from the group consisting of hexanediol diacrylate, 2-ethoxy-ethyl acrylate, 2'-ethoxy-2-ethoxy-ethyl acrylate and trimethylol propane triacrylate.

* * * * *

UNITED STATES PATENT AND TRADEMARK OFFICE
CERTIFICATE OF CORRECTION

PATENT NO. : 4,718,748

DATED : January 12, 1988

INVENTOR(S) : Broer et al

It is certified that error appears in the above-identified patent and that said Letters Patent is hereby corrected as shown below:

Column 7: Line 6 ..... delete .." _____ " (line)

Column 7: Line 10 .... delete .." _____ " (line)

Signed and Sealed this

Twenty-fifth Day of October, 1988

Attest:

DONALD J. QUIGG

Attesting Officer

Commissioner of Patents and Trademarks